United States Patent
Blewett

(10) Patent No.: US 6,526,448 B1
(45) Date of Patent: Feb. 25, 2003

(54) PSEUDO PROXY SERVER PROVIDING INSTANT OVERFLOW CAPACITY TO COMPUTER NETWORKS

(75) Inventor: Charles Douglas Blewett, Morris County, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/217,610

(22) Filed: Dec. 22, 1998

(51) Int. Cl.[7] .............................................. G06F 15/16
(52) U.S. Cl. ........................ 709/238; 709/239; 713/201
(58) Field of Search ................................. 709/218, 222, 709/224, 238, 239, 242, 241; 713/201, 10; 455/448

(56) References Cited

U.S. PATENT DOCUMENTS

| | | | |
|---|---|---|---|
| 5,444,848 A | | 8/1995 | Johnson, Jr. et al. ........ 709/241 |
| 5,636,216 A | | 6/1997 | Fox et al. ..................... 370/402 |
| 5,678,041 A | | 10/1997 | Baker et al. ..................... 707/9 |
| 5,708,780 A | | 1/1998 | Levergood et al. .......... 709/227 |
| 5,748,901 A | * | 5/1998 | Afek et al. .................. 709/238 |
| 5,835,718 A | * | 11/1998 | Blewett ....................... 709/218 |
| 5,852,717 A | | 12/1998 | Bhide et al. |
| 5,918,013 A | | 6/1999 | Mighdoll et al. |
| 6,047,322 A | * | 4/2000 | Vaid et al. .................... 709/224 |
| 6,119,235 A | * | 9/2000 | Vaid et al. .................... 713/201 |
| 6,122,514 A | * | 9/2000 | Spaur et al. .................. 455/448 |
| 6,185,598 B1 | * | 2/2001 | Farber et al. ................ 709/200 |
| 6,286,031 B1 | * | 9/2001 | Waese et al. ................ 709/203 |
| 6,304,892 B1 | | 10/2001 | Bhoj et al. |
| 6,308,216 B1 | * | 10/2001 | Goldszmidt et al. ......... 709/236 |
| 6,360,270 B1 | * | 3/2002 | Cherkasova ................. 709/229 |

* cited by examiner

Primary Examiner—Ayaz Sheikh
Assistant Examiner—Khanh Quang Dinh
(74) Attorney, Agent, or Firm—Ahsan & Associcates; Aziz M. Ahsan; Robert Canavan

(57) ABSTRACT

A pseudo proxy server is provided for a host network when the host network experiences periods of congestion. The host network determines whether an arrival rate of data requests exceeds a predetermined threshold. If so, the host network adds an address of a pseudo proxy server to a list of servers aliased to the host network. Thereafter, data requests are routed to the pseudo proxy server on a round robin basis. The pseudo proxy server may be engaged without first loading information content from the host network on the pseudo proxy server.

28 Claims, 2 Drawing Sheets

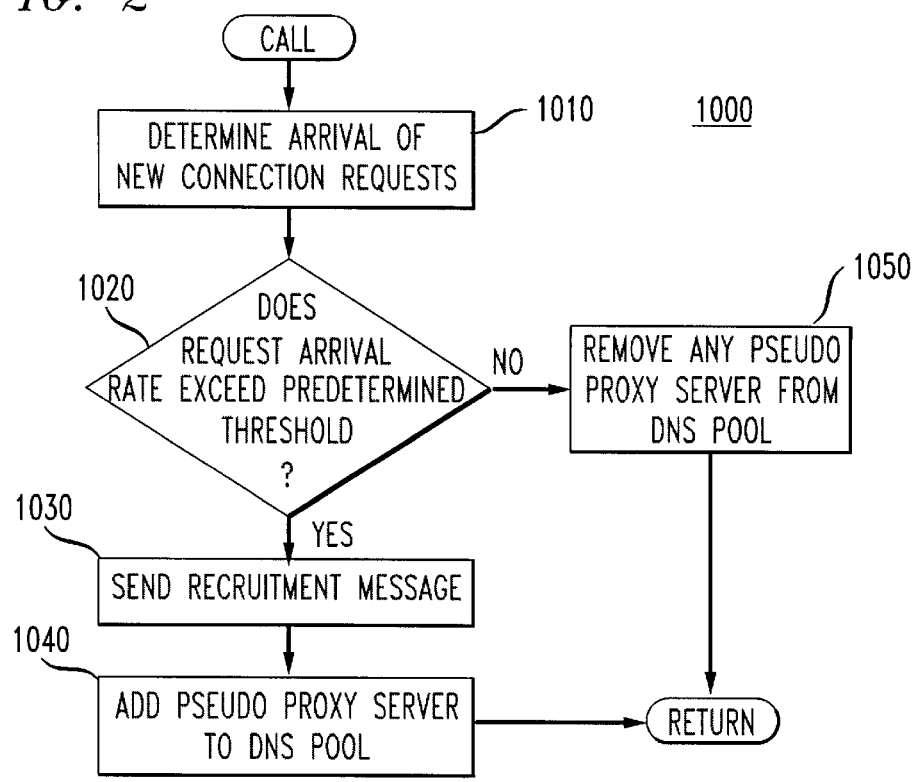
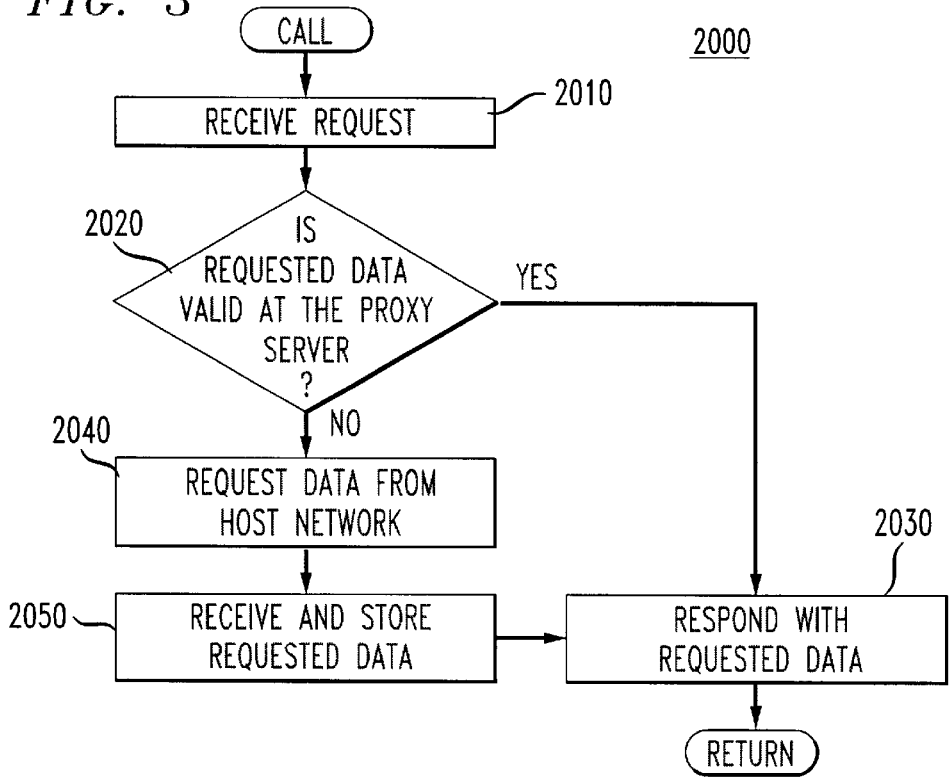

PSEUDO PROXY SERVER PROVIDING INSTANT OVERFLOW CAPACITY TO COMPUTER NETWORKS

BACKGROUND

The present invention provides a resource management scheme for a content provider in a computer network.

Predicting web server capacity can be a problem with serious financial repercussions. Often a hosting provider maintains a computer network and leases capacity to a content provider. The hosting provider may be contractually obligated to guarantee that it will provide server capacity sufficient to meet demand to the content provider's site. A failure to meet demand may mean lost revenue for the content provider. A failure to meet capacity guarantees may mean lost revenue to the hosting provider. On the other hand, providing static capacity for a content provider may be financially disadvantageous to the hosting provider. If a server is dedicated for the use of a first content provider but is under used, the excess capacity could be used to service a second content provider and generate additional revenues.

Ideally, a hosting provider would provide server resources to a content provider in a manner that ebbs and flows with the demand for service from the provider's site. New servers would be added to the provider's site as the demand for the site increases. The new server may be included in a round robin DNS pool of machines and aliased to a particular host name. However, the act of booting up a server and loading it with information content from the content provider takes time. It may not be possible to load the server in enough time to meet a sharp, unexpected rise in customer demand. Accordingly, there is a need in the art for a resource management scheme for host networks that dedicates new servers to host sites in real-time with escalating demand.

SUMMARY

According to an embodiment of the present invention, a pseudo proxy server is provided for a host network when the host network experiences periods of congestion. When a data request is received at the host network, the host network determines whether an arrival rate of data requests exceeds a predetermined threshold. If so, the host network adds an address of a pseudo proxy server to a list of servers aliased to the host network. Thereafter, data requests are routed to the pseudo proxy server on a round robin basis. The pseudo proxy server may be engaged without first loading information content from the host network on the pseudo proxy server.

BRIEF DESCRIPTION OF THE DRAWINGS

FIG. 2 is a flow diagram of a method of the host network conducted in accordance with an embodiment of the present invention.

FIG. 3 is a flow diagram of a method of the pseudo proxy server conducted in accordance with an embodiment of the present invention.

DETAILED DESCRIPTION

The present invention provides a pseudo proxy server system in which unregistered servers may be made to act as if they are part of a host network on a rolling basis. The pseudo proxy server may be added to a pool of servers and provide service to customer requests immediately. According to the present invention, there is no need to copy content from the content provider to the new server prior to use. Instead, the pseudo proxy server accepts customer requests immediately and copies content only as it is requested.

Figure 1:
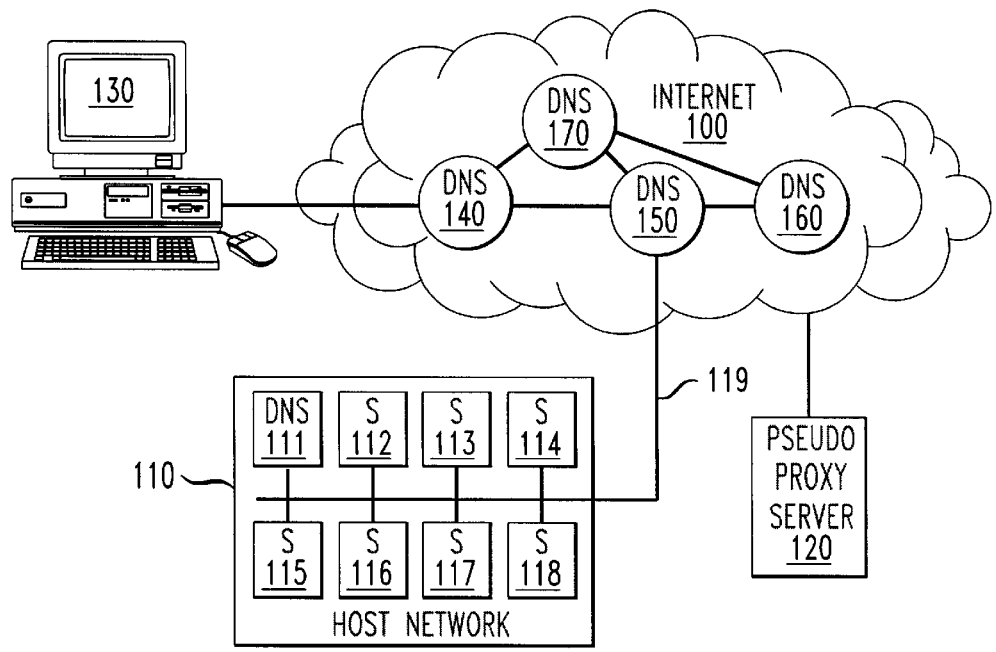
FIG. 1 is a block diagram of a computer network constructed in accordance with an embodiment of the present invention.

FIG. 1 illustrates a block diagram of a pseudo proxy server implemented according to an embodiment of the present invention. FIG. 1 illustrates an Internet 100, a host network 110, a pseudo proxy server 120 and a client terminal 130. The host network 110 may be populated by a DNS server 111 and a plurality of content servers 112–118. The host network may be connected to the Internet via a interface line 119 such as a Ti telephone line or the like.

The content servers 112–118 store information content that has been preloaded by content providers or the like. The content servers 112–118 respond to connection requests from client terminal 130 and the like according to convention techniques in the art. The content servers 112–118 also engage in a coordinated network management process to monitor the performance of the host network 110. As is known, a "monitoring process" of the host network 110 monitors, for example, bandwidth availability on line 119, disk or CPU availability of the various content servers 112–118 and other operating conditions of the host network 110 that relate to its ability to handle other connection requests. The known http log monitoring process is an example of such a monitoring process.

The DNS server 110 stores a "DNS pool" (not shown), a table that associates a machine name of the host network 110 with the IP addresses of the content servers 112–118. An example of a machine name is "www.att.com." Typically, when the DNS is presented with the machine name of the host network 110, it retrieves an IP address of one of the content servers 112–118 on a round robin basis. A client terminal 130, once it has received the IP address of a content server 112 would direct a connection request to the IP address. As is known, a DNS server 111 may be provided within the host network 110 as shown in FIG. 1 but also may be provided elsewhere on Internet 100.

The pseudo proxy server 120 is a traditional computer server. Typically, it is provided in communication with Internet 100 from a location that is spatially separated from the host network 110.

As is typical in the art, each of the content servers 112–118 and the pseudo proxy server 120 possess connect queues (not shown) in which they are able to receive and buffer a predetermined number of connection requests. As is known, the incoming requests are queued in an operating system kernel. The number of connection requests that can be buffered by a single server is finite and predetermined. When a content server (say, server 112) buffers its maximum number of connection requests, any additional connection requests to that content server 112 fail. As noted, failed connection requests are undesirable.

FIG. 2 illustrates a method of operation that may be conducted by the monitoring process in accordance with an embodiment of the present invention. The method may be invoked periodically, such as once per minute, or upon the receipt of a new connection request to the host network 110. According to the method, the monitoring process measures an arrival rate of new connection requests (Step 1010). The monitoring process also determines whether the arrival rate of customer requests exceeds a predetermined threshold (Step 1020). If so, the monitoring process causes the pseudo proxy server 120 to be signaled with a "recruitment" message to indicate that the pseudo proxy server 120 should thereafter provide service on behalf of the host network 110 (Step 1030). The monitoring process adds an address of the pseudo proxy server 120 to the DNS pool (Step 1040).

If, at step 1020, the host network is not operating in a congested state, the monitoring process removes the IP address of any pseudo proxy server from the DNS pool (Step 1050).

Typically, the predetermined threshold is established according to capacity limitations of the host network 110. For example, it may be set to 95% of the total capacity of content servers 112–118 or, if the capacity of line 119 could be bandwidth-limiting to the host network 110, to 95% of the bandwidth limit of line 119.

During peak loading periods, when the arrival rate exceeds the predetermined capacity threshold, a first call to the method 1000 will cause the address of the pseudo proxy server to be added to the DNS pool. Thereafter, name server requests to the DNS server 111 will cause the IP address of the pseudo proxy server 120 to be returned to the client terminal 130. The client terminal 130 will direct its connection request tot he pseudo proxy server 120 rather than a content server of the host network 110. Thus, requests to the congested content servers 112–118 will decrease instantly by a factor of 1/(n+1), where n is the number of content servers provided in the host network 110. This decrease in customer requests that are processed within the host network 110 permits the congested content servers 112–118 to reduce the number of buffered requests and work their way out of a congested state.

The present invention cooperates with traditional Internet routing. As is known, the Internet 100 also is populated by a number of DNS servers 140–170 organized into a predetermined hierarchy of levels. When a client terminal 130 attempts to connect to a host network 110, it communicates with a closest DNS server 140 to resolve the host's machine address (www.att.com) to an IP address. The DNS server 140 may or may not have stored a copy of the DNS pool stored by DNS 111. If it does not, the DNS server 140 communicates with other DNS servers of the Internet 100 to resolve the machine address into an IP address. Once DNS server 140 obtains a copy of the DNS pool, it selects one of the IP addresses and provides it to the client terminal 130. The client terminal directs a connection request to the selected content server (say, server 112).

After the machine address is resolved, the DNS server 140 also stores the DNS pool locally. If it receives the same machine address from the same client terminal (or another terminal), it may resolve the machine address without having to communicate with other servers. Typically, each DNS server 140–180 of the Internet 100 stores a DNS pool only for a predetermined time; they expire when the predetermined time period concludes.

After the congestion events subside, the DNS servers' association between the pseudo proxy server and the host network's Internet address will expire according to known techniques.

The method 1000 may continue to operate even after a first pseudo proxy server 120 is engaged. If the rate of connection requests to the host network 110 continues to rise and the host network again reaches a congestion condition, the method 1000 may engage additional pseudo proxy servers (not shown).

Returning to FIG. 1, it will be appreciated that a percentage of customer requests are routed to the pseudo proxy server 120 located elsewhere in Internet 100. As noted above, the pseudo proxy server 120 is not pre-loaded with information content from the host network 110. FIG. 3 illustrates a method of operation of the pseudo-proxy server 120 conducted in accordance with an embodiment of the present invention.

The method 2000 may begin when the pseudo proxy server 120 receives a request that has been routed to it (Step 2010). Upon receipt, the pseudo proxy server 120 determines whether it possesses valid data that can satisfy the data request (Step 2020). If so, the pseudo proxy server 120 furnishes the requested data in response to the data request (Step 2030).

If the pseudo proxy server 120 cannot satisfy the data request, it requests data from the host network 110 (Step 2040). Upon receipt of the requested data, the pseudo proxy server 120 stores the data (Step 2050) and furnishes it in response to the data request at Step 2030.

In many applications, when a host network experiences an unexpectedly high number of data requests, the requests typically request the identical information. Consider, as an example, an application where a host network 110 stores news. Exemplary Internet news services, at the time of this writing, may be found at www.cnn.com and www.washingtonpost.com. There may be others. These networks may store a variety of information content related to news items as diverse as national news, international news, sports and the arts. Within each topical category of news, there may be hundreds of articles relating to various newsworthy events. However, in a typical application, when a news organization experiences a unexpectedly high demand for information content, the demand will be related to a breaking news event—one that is covered in a single or very few number of news articles.

If the pseudo proxy server 120 were used to provide overflow service in such an event, operation of the method 2000 of FIG. 3 will cause the pseudo proxy server 120 to receive a number of data requests, each directed to the same article or set of articles. Upon receipt of the first such request, the pseudo proxy server 120 would not have a copy of the article stored locally. It would progress through Steps 2040 and 2050 to obtain one from the host network 110. Thereafter, however, when it continues to receive requests to the same article describing breaking news, the pseudo proxy server 120 would have a copy of the article stored locally and would furnish it in a response without having to contact the host network 110 according to steps 2040–2050. Again, the pseudo proxy service permits a server to be placed in service without having to store a priori all information content from the host network 110 locally at the pseudo proxy server 120.

During use, the pseudo proxy server 120 may receive several requests for the same information simultaneously. That is, it may receive two requests for the same information sequentially. In response to the first received request, the pseudo proxy server 120 obtains the requested data from the host network 110. The pseudo proxy server 120 may process transactions in such a way that it begins processing of a second transaction before processing of a first transaction has completed. In such an embodiment, the pseudo proxy server 120 may begin processing of the second data request before data associated with the first transaction has been received from the host network 110 according to Step 2050. The pseudo proxy server 120 preferably contains software control that, for a second data request, "looks ahead" and determines whether the server 120 will receive the requested data pursuant to an earlier-received (first) data request. In such a case, the pseudo proxy server 120 may stall processing of a second data request to the same information content to avoid communicating twice with the congested host network 110.

The pseudo proxy server 120 may perform any number of checks to determine whether it stores a valid copy of requested data locally. In a first simplest embodiment, it may determine that data is valid if it possesses a copy of the requested data. In other embodiments, a host network may define that information content from the network is valid only for a predetermined time. For example, according to the known Hypertext Transfer Protocol ("HTTP"), data may be assigned an expiration time; data is considered valid until the expiration time is reached. Even if the pseudo proxy server 120 stores a copy of the requested data, it may determine that the copy is invalid because its age exceeds the predetermined time defined by the host network 110. If the copy of data is invalid because it is too old, the pseudo proxy server 120 obtains another newer copy of the data according to Steps 2040–2050.

In other embodiments, the host network 110 may be configured to broadcast messages to invalidate data stored by its own content servers 112–118 and any pseudo proxy servers 120 that may be acting on its behalf. These "kill" messages may be broadcast by the host network 110 when information content of a data item changes. Typically, a data item is amended by a user. When the data item is amended, a server in the host network 110 addresses a kill message to all servers listed in the DNS pool of router 111. The kill message identifies the old data item. In response, the servers 112–118, 120 mark the old data items (if any are stored) as invalid.

Figure 4:
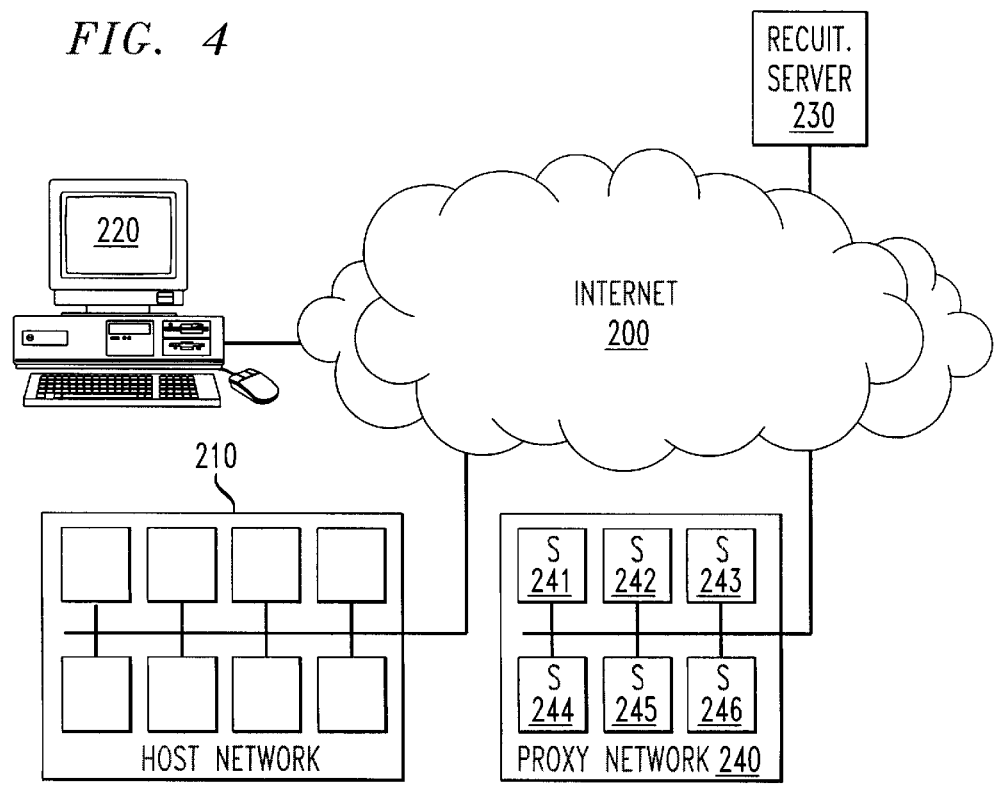
FIG. 4 is a block diagram of a computer network constructed in accordance with an embodiment of the present invention.

According to an embodiment of the present invention, a pseudo proxy service may be provided as a network service to content providers. FIG. 4 illustrates a computer network constructed in accordance with such an embodiment. There, an Internet 200 is provided in communication with a host network 210 and a client terminal 220. The Internet 200 also is provided in communication with a recruitment server 230 and a proxy network 240. The proxy network 240 may be populated servers 241–246 according to any number of known network topologies.

The recruitment server 230 performs administrative processes related to the pseudo proxy service. It maintains a table of all servers that may provide the pseudo proxy service to host networks. In the example of FIG. 4, the recruitment server 230 would maintain addresses of servers 242–246. The recruitment server 230 may possess other functionality that would be conventional to a commercial service. For example, it may perform validation and billing functions that are typical to many commercial computer implemented services.

In the embodiment of FIG. 4, the monitoring process of the host network 210 may operate in accordance with the method 1000 of FIG. 2. If the monitoring process reaches step 1030, the monitoring process directs the recruitment messages to the recruitment server 230. The recruitment server 230 recalls an address of an available server in the pseudo proxy network 240 (say, server 242) and returns the address to the host network 210 monitoring process. Thereafter, the method 1000 proceeds normally.

Before providing the IP address of the selected server 242 to the host network 110, the recruitment server 230 communicates with the selected server 242 and provides it with information indicating that it should provide overflow support for host network 210. In the embodiment of FIG. 4, the method 2000 of FIG. 3 may be performed by the server 242 selected by the recruitment server.

The principles of the present invention also are applicable to extend server operations that require execution of server processing to fulfill data requests. A common example is the known Common Gateway Interface ("CGI"), a tool commonly used for creating web pages dynamically, among others. According to an embodiment of the present invention, when a pseudo proxy server 120 (FIG. 1) encounters a data request that requires execution of a CGI process, (and the pseudo proxy server 120) does not store the process, the pseudo proxy server requests the process from the host network 110. (FIG. 3, Step 2040) along another that may be required to complete the data request (e.g. web page content). In this embodiment, the request made by the pseudo proxy server 120, at step 2040 identifies the pseudo proxy server's status and distinguishes it from client terminals such as terminal 130. In response, the host network 110 transfers the processes (and data, if requested) to the pseudo proxy server 120. Once received, the pseudo proxy server executes the process and completes the data request.

One of the benefits of the present invention is that the pseudo proxy 120 may be employed without having to modify any communication protocols that may be defined for the client terminal 130. The addition or removal of a pseudo proxy server 120 is transparent to the client terminal 130. In this manner, the pseudo proxy server 120 operates differently than known proxies which typically have their own predefined protocol.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A method for managing overflow capacity in a computer network, comprising:
    when a data request is received at the computer network, determining whether an arrival rate of data requests exceeds a predetermined threshold,
    if the predetermined threshold is exceeded, adding an address of a pseudo proxy server to a list of servers aliased to the computer network and sending a recruitment message to the pseudo proxy server.

2. The method of claim 1, further comprising, thereafter routing data requests to the pseudo proxy server on a round robin basis with other servers of the computer network.

3. The method of claim 1, wherein the predetermined threshold is a predetermined capacity of servers in the computer network.

4. The method of claim 1, wherein the predetermined threshold is a predetermined bandwidth limit of a communications input to the computer network.

5. The method of claim 1, wherein the pseudo proxy server is added to the list of servers without first loading information content from the computer network on the pseudo proxy server.

6. A method for managing overflow capacity in a computer network, comprising:
    determining whether the network is operating in a congested state, and
    when the network is operating in a congested state, adding an address of a pseudo proxy server to a list of servers aliased to computer network and sending a recruitment message to the pseudo proxy server.

7. The method of claim 6, wherein the list is a DNS pool.

8. The method of claim 6, wherein the list associates a machine name of the network with IP addresses of servers that are members of the network.

9. The method of claim 6, wherein the adding occurs without a prior loading of information content from the network to the pseudo proxy server.

10. The method of claim 9, further comprising, at the pseudo proxy server:

receiving subsequent data requests addressed to the network, determining whether information content responsive to the data request is stored on the pseudo proxy server, and if not, retrieving responsive information content from another server on the computer network.

11. The method of claim 6, wherein a congestion decision is determined based on availability of communication resources in the network.

12. The method of claim 6, wherein a congestion decision is determined based on available disk resources in the network.

13. The method of claim 6, wherein a congestion decision is determined based on available processor resources in the network.

14. The method of claim 6, wherein a congestion decision is determined from a http log monitoring process at the network.

15. A method for managing overflow capacity in a computer network, comprising:

when a data request is received at the computer network, determining whether an arrival rate of data requests exceeds a predetermined threshold, if the predetermined threshold is exceeded, adding an address of a pseudo proxy server to a list of servers aliased to the computer network and sending a recruitment message to a server to temporarily act as the pseudo proxy server to manage overflow capacity in the computer network.

16. The method of claim 15, further comprising, thereafter routing data requests to the pseudo proxy server on a round robin basis with other servers of the computer network.

17. The method of claim 15, wherein the predetermined threshold is a predetermined capacity of servers in the computer network.

18. The method of claim 15, wherein the predetermined threshold is a predetermined bandwidth limit of a communications input to the computer network.

19. The method of claim 15, wherein the pseudo proxy server is added to the list of servers without first loading information content from the computer network on the pseudo proxy server.

20. A method for managing overflow capacity in a computer network, comprising:

determining whether the network is operating in a congested state, and when the network is operating in a congested state, adding an address of a pseudo proxy server to a list of servers aliased to computer network and sending a recruitment message to an unregistered server to act as the pseudo proxy server to manage overflow capacity in the computer network.

21. The method of claim 20, wherein the list is a DNS pool.

22. The method of claim 20, wherein the list associates a machine name of the network with IP addresses of servers that are members of the network.

23. The method of claim 20, wherein the adding occurs without a prior loading of information content from the network to the pseudo proxy server.

24. The method of claim 23, further comprising, at the pseudo proxy server:

receiving subsequent data requests addressed to the network, determining whether information content responsive to the data request is stored on the pseudo proxy server, and if not, retrieving responsive information content from another server on the computer network.

25. The method of claim 20, wherein a congestion decision is determined based on availability of communication resources in the network.

26. The method of claim 20, wherein a congestion decision is determined based on available disk resources in the network.

27. The method of claim 20, wherein a congestion decision is determined based on available processor resources in the network.

28. The method of claim 20, wherein a congestion decision is determined from a http log monitoring process at the network.

* * * * *